United States Patent [19]

Lehureau et al.

[11] 4,128,309
[45] Dec. 5, 1978

[54] AUTOMATIC OPTICAL FOCUSING DEVICE

[75] Inventors: Jean-Claude Lehureau; Roland Malissin; Gérald Roullet, all of Paris, France

[73] Assignee: Thomson-Brandt, Paris, France

[21] Appl. No.: 714,805

[22] Filed: Aug. 16, 1976

[30] Foreign Application Priority Data

Aug. 19, 1975 [FR] France .................. 75 25693

[51] Int. Cl.² ............................................. G02B 5/10
[52] U.S. Cl. ..................................................... 350/295
[58] Field of Search ................ 250/201; 350/285, 295, 350/160 R, 161 R, 161 S

[56] References Cited

U.S. PATENT DOCUMENTS

| | | | |
|---|---|---|---|
| 3,299,368 | 1/1967 | Klebba | 350/295 UX |
| 3,876,875 | 4/1975 | Velzel | 250/201 |

Primary Examiner—F. L. Evans
Attorney, Agent, or Firm—Cushman, Darby & Cushman

[57] ABSTRACT

The invention relates to the focusing of an optical system by variation of the radius of curvature of a reflecting element, comprising two prepolarized thin plates of piezoelectric material which are joined together and each of which carries an electrode, the outer surface of one of the two thin plates being made reflective. An electrical signal characteristic of the correction to be made is applied between the two electrodes and produces a variation in the radius of curvature of the thin plates. This reflecting element is used in an optical system of the Cassegrin type or as a reflecting mirror.

7 Claims, 7 Drawing Figures

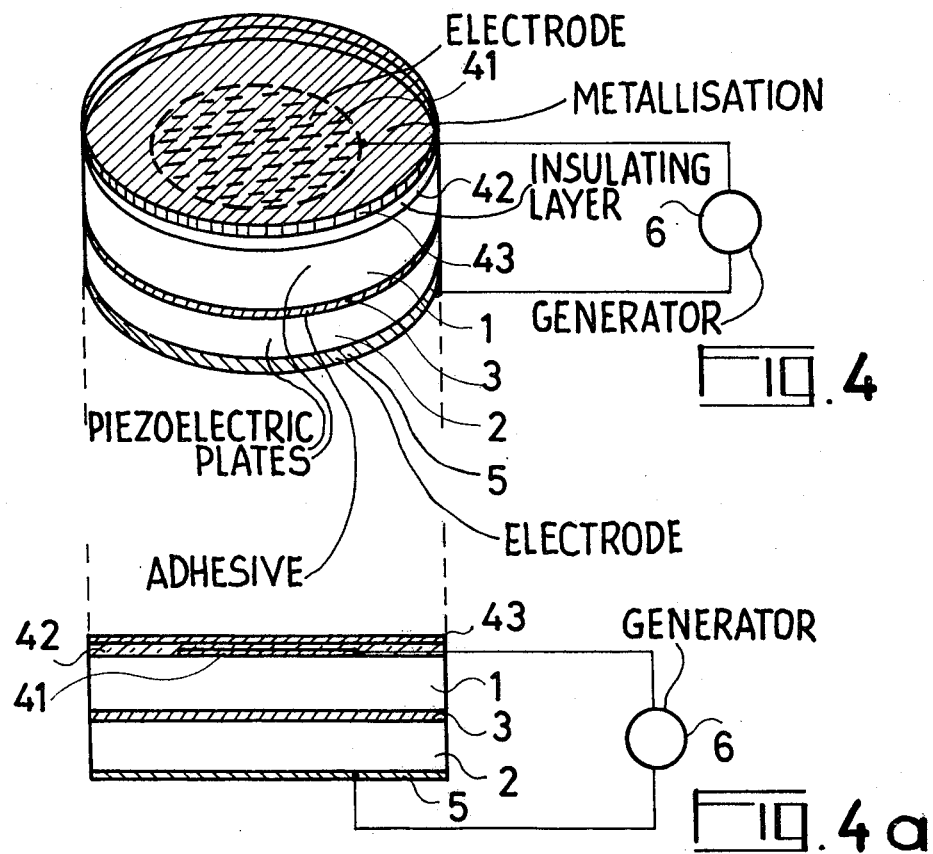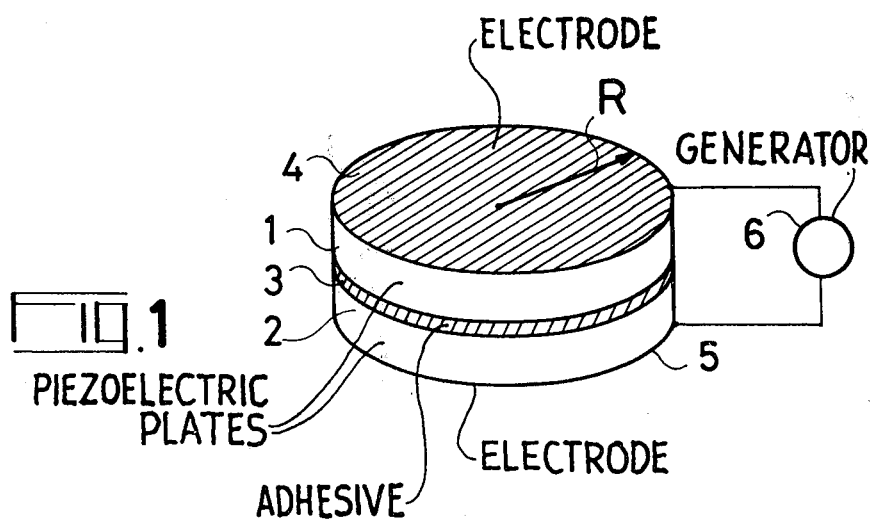

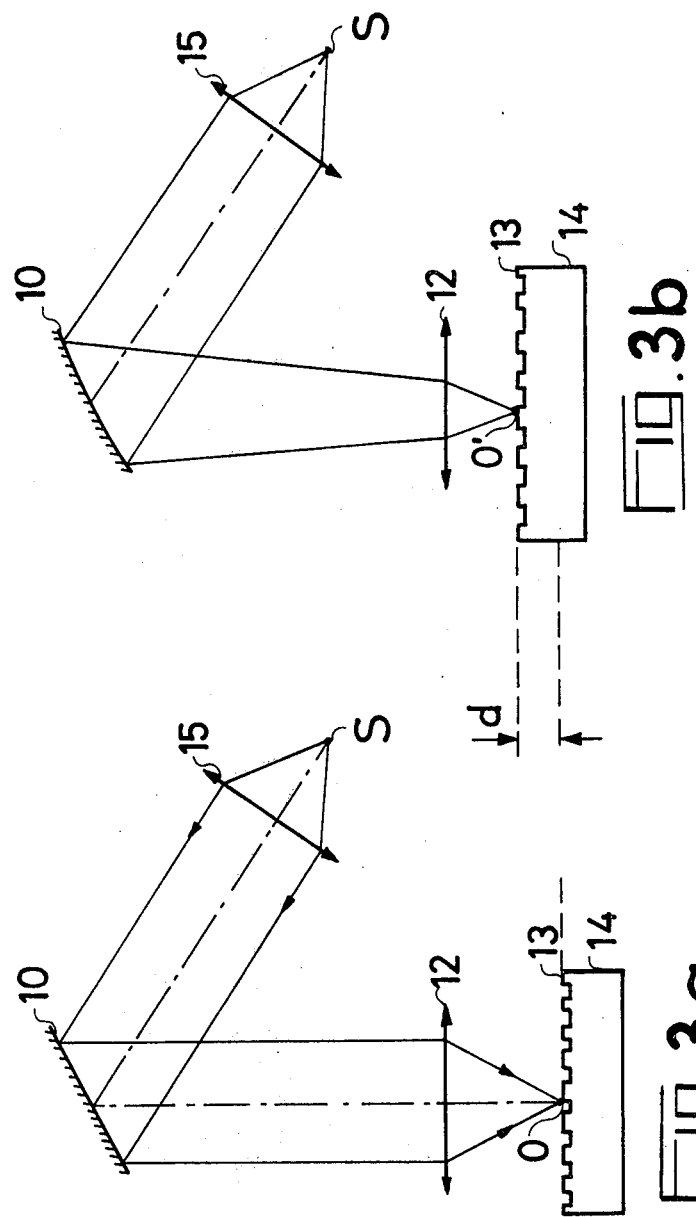

AUTOMATIC OPTICAL FOCUSING DEVICE

This invention relates to the focusing of optical observation systems and is particularly applicable to the focusing of optical readers of data recorded on a track carried by a moving data carrier which, for reading this track, use a reading beam concentrated onto the track.

To obtain observation or reading of high quality, focusing has to be very precise.

In order to obtain automatic focusing, it is known that the reading lens may be displaced relative to the object or that the convergence of the reading beam may be modified in conjunction with an electrical control signal which is characteristic of the focusing error.

One known solution to the problem of varying the convergence of the reading beam is to modify the curvature of a mirror which reflects the reading beam. This mirror is formed by a flexible reflecting membrane to which a pressure variable with the electrical control signal is applied by means of, for example, a stack of thin piezoelectric plates, each of which undergoes a deformation in thickness under the effect of the signal, the various deformations being added to one another.

Since, in such a system, the force applied acts orthogonally of the reflecting membrane, it is difficult to control the deformation of the membrane and, when the membrane is introduced into an optical system, the reflecting surface has to be suitably positioned to ensure that the system in question has satisfactory optical qualities.

The present invention enables these disadvantages to be obviated by using a reflecting surface integral with one of the faces of an element of the bimetallic strip type formed by two thin plates radially deformable in opposite directions under the action of an electrical field which brings the reflecting surface into the form of a roughly spherical mirror of which the radius of curvature is variable in dependence upon the field applied. An element such as this, introduced into an optical system, may replace the delicate focusing movement of conventional microscopes or may be used as a focusing control motor during the reading of a videodisc for example.

According to the invention, there is provided an automatic optical focusing device comprising a reflecting element having two external faces and comprising two circular thin plates bonded together by a bonding material, at least one of said plates being formed with a piezoelectric prepolarized material, one of said external faces being reflecting, and polarizing means for applying an electrical field throughout the thickness of said prepolarized plate, said electrical field producing a radial deformation of said plate which deforms said element as a whole in curving said reflecting face.

For a better understanding of the invention and to show how the same may be carried into effect, reference will be made to the following description and the attached drawings among which:

FIG. 1 shows a reflecting element with a variable radius of curvature suitable for use in a system according to the invention.

FIGS. 4 and 4(a) shows a second embodiment of the reflecting element.

Figure 2B:
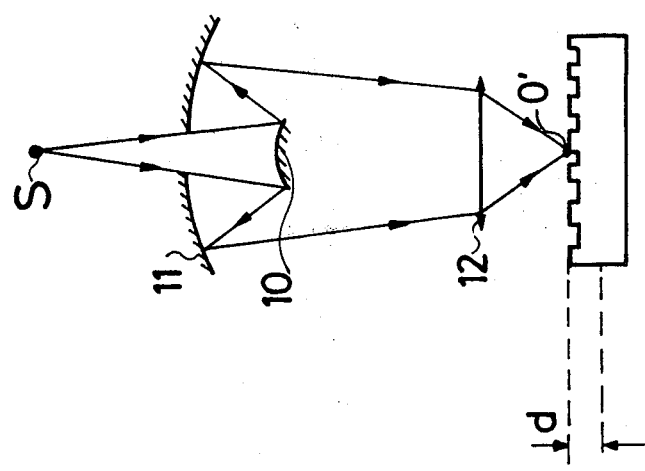
FIG. 2 shows an automatic optical focusing system at (a) and (b) when the reflecting element has two different forms FIGS. 3(a) and (b) show a second automatic optical focusing system.

As shown in FIG. 1, the reflecting element is formed by two prepolarized thin plates 1 and 2 of a pizoelectric ceramic which are radially deformable under the effect of an electrical field applied throughout the thickness of the thin plates, this thickness being of the order of 250 μm and their radius of curvature amounting to between 5 and 10 mm.

Under the effect of one and the same field, these two thin plates are deformable in opposite directions. They are separated by a connecting layer 3 which may be formed by adhesive and iron filings. The outer surfaces of the thin plates carry electrodes 4 and 5, respectively. One of the surfaces of the two-plate structure, the electrode 4 in FIG. 1, is polished to form the reflecting surface.

The two electrodes 4 andd 5 are connected to the terminals of a control generator 6 which develops an electrical field of variablle amplitude between the outer surfaces of the element thus formed.

Under the effect of this electrical field, there occurs for example contraction of the plate 2 and extension of the plate 1. These radial deformations tend to deform the structure into the shape of a spherical cap to an extent which is greater, the more intense the electrical field applied. However, the intensity of the electrical field applied must remain within such limits that the deformations are reversible, which means that the radius of curvature reached must not be too small.

With a two-plate structure having the dimensions given above (thickness 250 microns, radius 5 to 10 mm), the minimum radius of curvature of the reflecting surface may be of the order of 1 meter, which corresponds to a variation in vergency of two dioptres. The control dynamics are more or less high, depending upon the optical system in which this element is used.

For thin plates with a diameter of 1 cm, which may be given a radius of curvature equal to 1 m, the outer radius r has a relative variation $\Delta r/r$ substantially equal to $4 \times 10^{-6}$. This deformation is sufficiently slight for there not to be any significant stressing in the material thus deformed.

The quality of the roughly spherical mirror thus obtained is dependent upon the constituent material of the thin plates, which must be isotropic, and upon the polish of the reflecting surface which must be perfectly flat at rest.

The pizoelectric ceramic material used may be lead zirconate titanate (PZT). This material is difficult to polish. For this reason, it is possible, whilst retaining the two-plate structure, to use a thin plate of PZT and a thin plate of glass, the thin plate of glass being able to be polished very easily. The mode of operation of the system remains the same, except that only the thin plate of PZT is deformed. During the compression or extension of the PZT, the structure curves in one direction or the other. The thin plate of glass follows the deformations but does not create any, the dynamics of the structure are halved, but this system may be of better optical quality This reflecting element with a variable radius of curvature may be used in an optical system of the Cassegrin type as diagrammatically illustrated in FIG. 2. This system is shown at (a) when the reflecting element is flat and at (b) when the reflecting element has a radius of curvature. It comprises a light source S which emits a light beam onto the reflecting element 10 (representing the device illustrated in FIG. 1, of which only the reflecting surface 4 is shown). At rest, the element 10 is perpendicular to the optical axis of the beam, its centre being situated on the optical axis so that, when a control signal is applied, the centre of curvature of this reflecting surface is situated on the optical axis. The beam reflected by the element 10 passes to a spherical mirror 11 of which the centre is also situated on the optical axis and the beam thus reflected is focused onto the engraved surface 13 of a data-carrying disc 14 by means of an objective which, in the drawing, is symbolised by a convergent lens 12.

A signal characteristic of the distance between the track and the focusing spot of the leading beam, obtained by means of a device for measuring the radiation transmitted or reflected by the carrier (depending on whether the carrier is readable by transmission or by reflection), is applied between the electrodes 4 and 5 of the reflecting element and causes its radius of curvature to vary, as explained earlier on.

Optical systems of the Cassegrin type have the disadvantage of incurring losses of energy. Accordingly, it can be of advantge to use the reflecting element no longer on the optical axis of the light beam, but instead as a return element. However, the angle of incidence of the light beam on this angle of the order of 45°, significant astigmatism appears with a radius of curvature of less than 20 m.

Figure 2A:
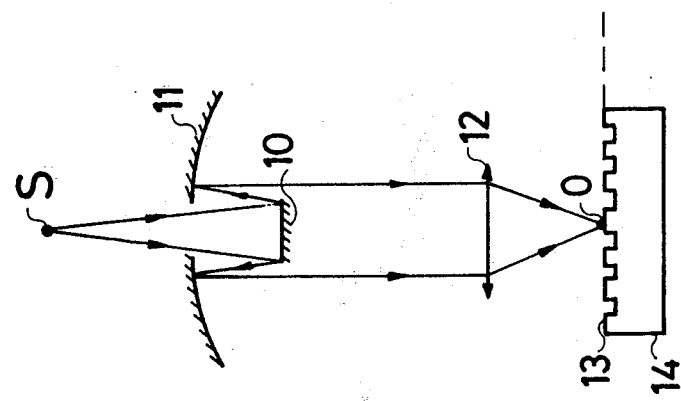

An optical system of this kind is shown in FIG. 3 where the same elements as in FIG. 2 are denoted by the same references. A light souce S emits a beam which, after passing through a convergent lens 15, is substantially parallel so that the rays reaching the reflecting element 10 all have substantially the same incidence angle, this angle being less than 45°. The beam reflected by the reflecting element 10 is focused by the lens 12 so that the focusing spot of the beam is situated precisely on the track 13 carried by the data carrier 14.

FIG. 3(a) shows the system when no control signal is applied to the reflecting element, the beam being focused at 0, whilst FIG. 3(b) shows the same system when a control signal has given this reflecting element a radius of curvature, the racking having been displaced relative to the lens by d, so that the focusing spot of the beam is situated at 0'.

In order in this case to ensure that the optical qualities of the system are good, it is necessary, in addition to the absolute flatness of the reflecting element and the isotropy of the piezoelectric material, to ensure that the radius of curvature does not become too small (less than 20 m) so that the astigmatism of the reflecting element is not too high.

The reflecting element with a curvature variable by means of an electrical signal shown in FIG. 4 enables this lack of stigmatism to be overcome so that the dynamics of the system are greater when this element is used as a return element.

In this drawing, the same elements as in FIG. 1 are denoted by the same references. The two thin plates 1 and 2 joined by a connecting layer 3 are again shown. The thin plate 2 is provided with an electrode 5, but the thin plate 1 is no longer covered by a single layer, which formed the electrode and the reflecting surface, but instead with three successive layers: a metallisation layer 41 covers the central zone of the thin plate 1. This layer forms the elctrode connected to the generator 6, the other terminal of the generator being connected to the electrode 5 in the same way as before. An insulating layer 42 is deposited on this electrode and on that part of the thin plate 1 which is not covered by the electrode. This insulating layer is then coated with a metallisation layer 43 which, after polishing, forms the reflecting surface of the structure. Under the effect of an electrical signal applied between the electrodes 5 and 41, the two thin plates being deformable in opposite directions in the same way as before, the thin plate 2 is deformed in its entirely whilst the thin plate 1 is deformed in the opposite direction in its central zone so that, in this central zone, the deformations are added to one another, whereas in the peripheral zone only the thin plate 2 is deformed, producing a deformation of the thin plate 1 of smaller amplitude than at the centre. This deformation in the plane perpendicular to the thin plates may be compared with a parabola. Now, it is known that a paraboloid of revolution is stigmatic for the pair of points formed by the focus of the parabola and the point to infinity in the direction of the axis. By giving the reflecting element a shape which resembles a portion of a parabola, the reflecting element provides the system with better optical qualities.

The proposed solution may also be used in other types of optical systems, in particular in the system of the CAssegrin type described above.

The invention is by no means limited to the embodiments described and illustrated. In particular, it is possible to adapt the shape of the metallised layers forming the electrodes of the two-plate structure in such a way that, after deformation, the mirror has a cross-section adapted to the optical system into which it is to be introduced. In particular, it is possible to obtain a mirror having an arcuate cross-section in one sectional plane and a parabolic cross section in a sectional plane orthogonal to the first by metallising a strip of one surface of the two-plate structure.

What we claim is:

1. An automatic optical focusing device for moving the focusing spot of a radiation beam along the optical axis of said beam according to a control signal, said device comprising a reflecting element having two external faces, said reflecting element comprising two circular thin plates bonded together by a bonding material, at least one of said plates being formed with a piezoelectric preopolarized material, one of said external faces being reflective, a convergent element for focusing said radiation beam reflected by said reflecting element at said focusing spot, and polarizing means for applying said control signal to said element, said control signal inducing an electrical field throughout the thickness of said prepolarized plate producing a radial deformation of said plate which deforms said element as a whole in curving said reflective face.

2. An optical device as claimed in claim 1, wherein said two plates have respective first and second faces and are formed with a piezoelectric prepolarized material, the radial deformation of one being oppositely directed to the deformation of the other under the effect of one and the same electrical field, said thin plates being bonded together at their first faces and said polarizing means being formed by two electrodes respectively provided on the second faces of said thin plates.

3. An optical device as claimed in claim 2, wherein said electrodes have the same dimensions as the faces of said thin plates, the reflecting element as a whole being deformable into the shape of a roughly spherical cap, one of said electrodes being polished to form the reflecting face of said element, the radius of curvature of said spherical cap being dependent upon the amplitude of the electrical field applied between said electrodes.

4. An optical device as claimed in claim 1, wherein a first thin plate consists of a prepolarized piezoelectric material, the second thin plate consisting of a material capable of being readily polished, said reflecting face being formed on said polished thin plate.

5. An optical device as claimed in claim 1, wherein said piezoelectric material is lead zirconate titanate, said bonding material being a mixture of adhesive and iron filings.

6. An optical device as claimed in claim 4, wherein said second thin plate consists of glass.

7. An automatic optical focusing device for moving the focusing spot of a radiation beam along the optical axis of said beam according to a control signal, said device comprising a reflecting element having two external faces, said reflecting element comprising two piezoelectric prepolarized circular thin plates radially deformable under the control of an electrical field, the radial deformation of one being oppositely directed to the deformation of the other under the effect of one and the same electrical field, said plates having respective first and second faces and being bonded together by a bonding material at their first faces, a convergent element for focusing said radiation beam reflected by said reflecting element at said focusing spot, and polarizing means formed by two electrodes respectively provided on the second faces of said plates for applying said control signal to said element, said control signal inducing said electrical field, at least one of said electrodes being only arranged on part of the corresponding face of the plate associated therewith, an insulating layer being deposited on said electrode and on that part of said face outside said electrode, said insulating layer being coated with a reflecting film.

* * * * *